US007722466B2

(12) United States Patent
Rothschild

(10) Patent No.: US 7,722,466 B2
(45) Date of Patent: May 25, 2010

(54) INTEGRATION OF CASINO GAMING AND NON-CASINO INTERACTIVE GAMING

(75) Inventor: Wayne H. Rothschild, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 798 days.

(21) Appl. No.: 10/092,072

(22) Filed: Mar. 6, 2002

(65) Prior Publication Data

US 2003/0171149 A1 Sep. 11, 2003

(51) Int. Cl.

| | |
|---|---|
| ***A63F 13/02*** | (2006.01) |
| ***A63F 13/12*** | (2006.01) |
| ***G06Q 50/00*** | (2006.01) |
| ***A63F 1/00*** | (2006.01) |
| ***A63F 3/06*** | (2006.01) |
| ***A63F 5/04*** | (2006.01) |

(52) U.S. Cl. ............................ 463/42; 463/16; 463/20; 463/29; 463/30

(58) Field of Classification Search ............ 463/40–42, 463/25–32, 16–22

See application file for complete search history.

(56) References Cited

U.S. PATENT DOCUMENTS

| | | | | |
|---|---|---|---|---|
| 4,527,798 | A * | 7/1985 | Siekierski et al. | 463/17 |
| 4,805,907 | A * | 2/1989 | Hagiwara | 463/26 |
| 4,856,787 | A | 8/1989 | Itkis | 273/237 |
| 4,858,930 | A | 8/1989 | Sato | 273/85 G |
| 5,397,133 | A * | 3/1995 | Penzias | 463/22 |
| 5,489,103 | A * | 2/1996 | Okamoto | 463/29 |
| 5,586,937 | A * | 12/1996 | Menashe | 463/41 |
| 5,655,961 | A * | 8/1997 | Acres et al. | 463/27 |
| 5,674,128 | A * | 10/1997 | Holch et al. | 463/42 |
| 5,707,286 | A | 1/1998 | Carlson | 463/16 |
| 5,759,102 | A * | 6/1998 | Pease et al. | 463/42 |

(Continued)

FOREIGN PATENT DOCUMENTS

| | | |
|---|---|---|
| EP | 0829834 A2 | 3/1998 |

(Continued)

OTHER PUBLICATIONS

"Silicon Gaming Odyssey Slot Machine," by Adam Levinthal and Michael Barnett, 1063-6390/97, (c) 1997 IEEE, pp. 296-301, Proceedings of COMPCON 97.*

(Continued)

*Primary Examiner*—Peter DungBa Vo
*Assistant Examiner*—Matthew D Hoel
(74) *Attorney, Agent, or Firm*—Nixon Peabody LLP

(57) ABSTRACT

A web-based system for integrating casino gaming with non-casino interactive gaming comprises a central server system, a plurality of player-operated gaming machines, and a player-operating computing device. The central server system offers a plurality of wagering games. The gaming machines are located in a land-based casino and linked to the central server system by a reconfigurable, multi-site computer network such as an intranet. The computing device is remote from any land-based casino and linked to the central server system by the Internet. The wagering games may be conducted via either the gaming machines or the computing device. In one embodiment, each wagering game is offered in two distinct versions: basic and enhanced. The basic version is played over the network using JavaScript or other language. The enhanced version includes upgraded audiovisual content that is downloaded to and stored locally on the machine or computing device used to conduct the wagering game.

58 Claims, 2 Drawing Sheets

U.S. PATENT DOCUMENTS

| | | | | |
|---|---|---|---|---|
| 5,762,552 | A * | 6/1998 | Vuong et al. | 463/25 |
| 5,770,533 | A | 6/1998 | Franchi | 463/42 |
| 5,800,268 | A * | 9/1998 | Molnick | 463/40 |
| 5,816,918 | A | 10/1998 | Kelly et al. | 463/16 |
| 5,823,879 | A | 10/1998 | Golgberg et al. | 463/42 |
| 5,830,069 | A | 11/1998 | Soltesz et al. | 463/42 |
| 5,851,149 | A * | 12/1998 | Xidos et al. | 463/42 |
| 5,971,271 | A * | 10/1999 | Wynn et al. | 235/380 |
| 5,971,849 | A | 10/1999 | Falciglia | 463/16 |
| 5,999,808 | A | 12/1999 | LaDue | 455/412 |
| 6,001,016 | A * | 12/1999 | Walker et al. | 463/42 |
| 6,012,983 | A | 1/2000 | Walker et al. | 463/20 |
| 6,012,984 | A | 1/2000 | Roseman | 463/42 |
| 6,026,433 | A * | 2/2000 | D'Arlach et al. | 709/217 |
| 6,077,162 | A * | 6/2000 | Weiss | 463/26 |
| 6,080,062 | A | 6/2000 | Olson | 463/42 |
| 6,089,975 | A | 7/2000 | Dunn | 463/16 |
| 6,104,815 | A * | 8/2000 | Alcorn et al. | 380/251 |
| 6,113,495 | A | 9/2000 | Walker et al. | 463/42 |
| 6,117,011 | A | 9/2000 | Lvov | 463/25 |
| 6,135,884 | A | 10/2000 | Hedrick et al. | 463/20 |
| 6,135,887 | A * | 10/2000 | Pease et al. | 463/42 |
| 6,149,522 | A * | 11/2000 | Alcorn et al. | 463/29 |
| 6,183,362 | B1 | 2/2001 | Boushy | 463/25 |
| 6,183,366 | B1 | 2/2001 | Goldberg et al. | 463/42 |
| 6,196,920 | B1 | 3/2001 | Spaur et al. | 463/42 |
| 6,204,560 | B1 | 3/2001 | Daetwyler et al. | 257/745 |
| 6,210,274 | B1 | 4/2001 | Carlson | 463/16 |
| 6,264,557 | B1 | 7/2001 | Schneier et al. | 463/29 |
| 6,264,561 | B1 | 7/2001 | Saffari et al. | 463/42 |
| 6,272,223 | B1 * | 8/2001 | Carlson | 380/251 |
| 6,273,821 | B1 * | 8/2001 | Moriguchi | 463/42 |
| 6,286,003 | B1 | 9/2001 | Muta | 707/10 |
| 6,287,200 | B1 | 9/2001 | Sharma | 463/40 |
| 6,334,104 | B1 * | 12/2001 | Hirai | 704/258 |
| 6,346,048 | B1 * | 2/2002 | Ogawa et al. | 463/42 |
| 6,354,946 | B1 | 3/2002 | Finn | 463/40 |
| 6,361,437 | B1 | 3/2002 | Walker et al. | 463/23 |
| 6,402,618 | B1 * | 6/2002 | Reed et al. | 463/40 |
| 6,406,371 | B1 | 6/2002 | Baba et al. | 463/23 |
| 6,409,602 | B1 * | 6/2002 | Wiltshire et al. | 463/42 |
| 6,428,413 | B1 | 8/2002 | Carlson | 463/16 |
| 6,434,398 | B1 * | 8/2002 | Inselberg | 455/517 |
| 6,454,650 | B1 * | 9/2002 | Aronin | 463/17 |
| 6,488,580 | B1 | 12/2002 | Robb | 463/23 |
| 6,508,709 | B1 | 1/2003 | Karmakar | 463/42 |
| 6,508,710 | B1 | 1/2003 | Paravia et al. | 463/42 |
| 6,560,639 | B1 * | 5/2003 | Dan et al. | 709/218 |
| 6,652,378 | B2 * | 11/2003 | Cannon et al. | 463/20 |
| 6,749,510 | B2 * | 6/2004 | Giobbi | 463/42 |
| 6,805,634 | B1 * | 10/2004 | Wells et al. | 463/42 |
| 6,860,810 | B2 * | 3/2005 | Cannon et al. | 463/20 |
| 6,955,604 | B1 * | 10/2005 | Graves et al. | 463/42 |
| 6,986,055 | B2 | 1/2006 | Carlson | 713/200 |
| 7,083,520 | B2 * | 8/2006 | Rowe | 463/42 |
| 7,260,834 | B1 | 8/2007 | Carlson | 726/4 |
| 7,476,153 | B2 * | 1/2009 | Walker et al. | 463/20 |
| 2001/0044337 | A1 | 11/2001 | Rowe et al. | 463/29 |
| 2001/0044339 | A1 * | 11/2001 | Cordero et al. | 463/42 |
| 2002/0032049 | A1 * | 3/2002 | Walker et al. | 463/16 |
| 2002/0037767 | A1 * | 3/2002 | Ebin | 463/25 |
| 2002/0045484 | A1 | 4/2002 | Eck et al. | 463/42 |
| 2002/0068631 | A1 | 6/2002 | Raverdy et al. | 463/42 |
| 2002/0071557 | A1 | 6/2002 | Nguyen | 380/251 |
| 2002/0073043 | A1 * | 6/2002 | Herman et al. | 705/64 |
| 2002/0087876 | A1 * | 7/2002 | Larose | 713/200 |
| 2002/0107072 | A1 * | 8/2002 | Giobbi | 463/42 |
| 2002/0116615 | A1 | 8/2002 | Nguyen et al. | 713/168 |
| 2002/0137217 | A1 | 9/2002 | Rowe | 436/42 |
| 2002/0138594 | A1 * | 9/2002 | Rowe | 709/219 |
| 2002/0142846 | A1 * | 10/2002 | Paulsen | 463/43 |
| 2002/0147047 | A1 * | 10/2002 | Letovsky et al. | 463/42 |
| 2003/0028567 | A1 | 2/2003 | Carlson | 708/250 |
| 2003/0064771 | A1 * | 4/2003 | Morrow et al. | 463/16 |
| 2003/0162589 | A1 * | 8/2003 | Nguyen et al. | 463/25 |
| 2003/0195043 | A1 * | 10/2003 | Shinners et al. | 463/42 |
| 2004/0209660 | A1 | 10/2004 | Carlson et al. | 463/1 |
| 2005/0193209 | A1 | 9/2005 | Saunders et al. | 713/182 |
| 2006/0165235 | A1 | 7/2006 | Carlson | 380/268 |

FOREIGN PATENT DOCUMENTS

| | | | | |
|---|---|---|---|---|
| EP | 0843272 | A1 | | 5/1998 |
| WO | WO 98/35309 | | | 8/1998 |
| WO | WO 01/91866 | | * | 12/2001 |
| WO | WO 01/91866 | A1 | * | 12/2001 |
| WO | WO 2004/034223 | A2 | | 4/2004 |

OTHER PUBLICATIONS

"The Silicon Gaming Odyssey Slot Machine" (Levinthal, et al., pp. 296 to 301, 1063-6390/97, © IEEE, Proceedings of COMPCON 97).*

* cited by examiner

CASINO FLOOR LAYOUT

TRADITIONAL CASINO FLOOR LAYOUT

INTEGRATION OF CASINO GAMING AND NON-CASINO INTERACTIVE GAMING

FIELD OF THE INVENTION

The present invention relates generally to gaming machines and, more particularly, to a method, system, and gaming machine for efficiently integrating a player's casino gaming experience with the player's non-casino, interactive (i.e., "online") gaming experience.

BACKGROUND OF THE INVENTION

Gaming machines have been a cornerstone of the gaming industry for several years. They are operable to play such wagering games as mechanical or video slots, poker, bingo, keno, and blackjack. A typical gaming machine is cluttered with numerous hardware and software components for implementing such functions as game software execution, currency handling, player tracking, ticket reading and printing, and communicating with a back-of-house computer system. The numerous hardware and software components add significantly to the cost of manufacture (and therefore the selling price), complexity, and amount of maintenance and servicing required by the gaming machine in the field. Accordingly, one aspect of the present invention is directed toward a gaming machine that is cost-effective and easy to manufacture and requires less maintenance and servicing in the field.

Many gaming players want to be able to play gaming machines much more frequently then they are currently able to do. Such players are often limited because of the requisite travel required to attend casinos or other legal gaming establishments. The involvedness, cost, and inconvenience of a player being forced to travel to a casino severely limits the amount of gambling excursions that a player can assume. Furthermore, since these excursions are infrequent, a gaming player is often forced to spend as much time gambling as possible during the excursion because such a player may not have the means to return to the casino for several months or years. There is continuing need for a gaming player to be able to gamble more frequently or for a shorter period time than is currently available and to be able to do so from a location remote from the casino.

Toward that end, interactive or "online" gaming allows a player to gamble from a location, such as a residence, remote from the casino. The player may access a gaming web site on a global computer network, such as the Internet, from a computing device coupled to the global computer network. The computing device may, for example, be a personal computer, Internet appliance, personal digital assistant, or wireless telephone. To play a wagering game on the gaming web site, a player generally must supply credit or debit card account information. Wagers are deducted from the account, and payouts for winning outcomes are added to the account.

Interactive gaming is one of the most rapidly growing industries in the world. Although many jurisdictions prohibit interactive gaming, it is expected that such jurisdictions will ultimately legalize interactive gaming under detailed regulations. Also, despite the prohibition against interactive gaming, the global computer network includes countless gaming sites generally hosted by companies with minimal brand name recognition. These gaming sites are operational and generate substantial annual revenues.

It is believed that when interactive gaming is legalized, casinos with widespread brand name recognition will be positioned to capitalize on the interactive gaming market because players will be eager to wager with trustworthy brands. Casinos with the strongest brands will receive greater online patronage at their gaming web sites than gaming web sites hosted by less recognized companies. It is believed that casinos will want to maximize their relationship with players by integrating a player's casino gaming experience with the player's interactive gaming experience. Accordingly, another aspect of the present invention is directed toward a method, system, and gaming machine for efficiently achieving this integration.

SUMMARY OF THE INVENTION

In accordance with the present invention, a web-based system for integrating casino gaming with non-casino interactive gaming comprises a central server system, a plurality of player-operated gaming machines, and a player-operating computing device. The central server system offers a plurality of wagering games. The gaming machines are located in a land-based casino and linked to the central server system by a reconfigurable, multi-site computer network such as an intranet. The computing device is remote from any land-based casino and linked to the central server system by the Internet. The wagering games may be conducted via either the gaming machines or the computing device. In one embodiment, each wagering game is offered in two distinct versions: basic and enhanced. On the one hand, the basic version is played over the network using JavaScript or other language. On the other hand, the enhanced version includes upgraded audiovisual content that is downloaded to and stored locally on the machine or computing device used to conduct the wagering game.

BRIEF DESCRIPTION OF THE DRAWINGS

The foregoing and other advantages of the invention will become apparent upon reading the following detailed description and upon reference to the drawings.

Figure 1:
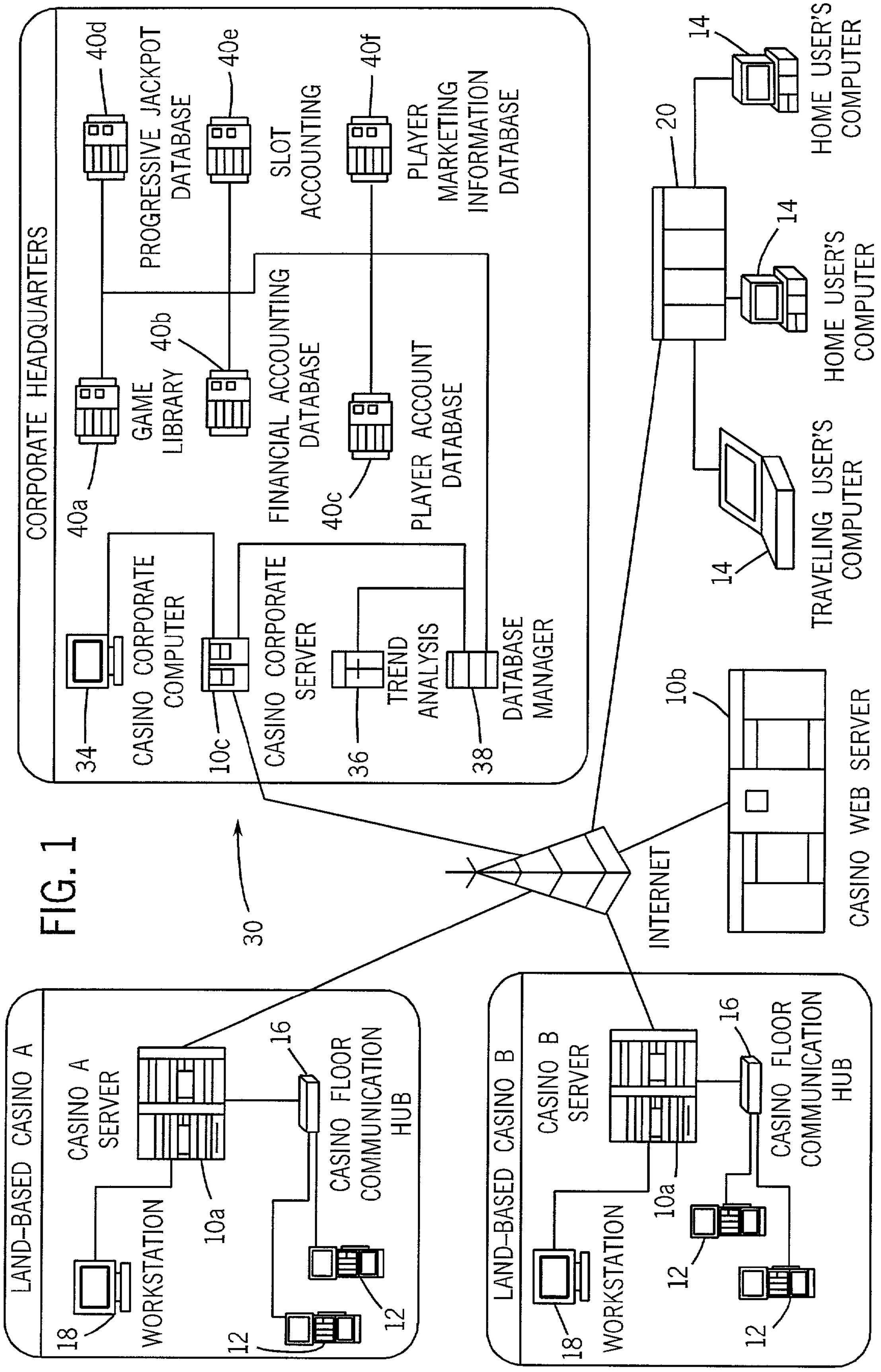
FIG. 1 is a block diagram of a system and method for integrating casino gaming with non-casino interactive gaming in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

To provide some background, interactive or "online" gaming (gambling) occurs on a global computer network. Starting in the 1990's, global computer networks such as the Internet became increasingly popular outlets. The Internet is a global communications network built on worldwide data and telephone networks. Computers connected to the Internet can exchange information with any other connected computer. The backbone of the Internet is founded on various sets of major telephone conduits and switches that exist across the world. These communications conduits are designed to move large volumes of data traffic at extremely high rates of speed.

Each of the major conduits referred to above terminates at a router, which is a large, fast switch that sorts the large volumes of data. Each router is connected to additional, local routing devices. Local routing devices, called "points of presence", provide local Internet access. For example, an Internet termination router located in Chicago may have point-of-presence routers connected in, for example, Milwaukee and Indianapolis. A router is able to connect as many point-of-presence routers as the capacity of the switching systems and the Internet will permit.

In addition to point-of-presence routers, commercial Internet exchanges and global Internet exchanges also connect to the routers. These exchanges transfer data between Internet service providers, both nationally and internationally. When data originates on one U.S. Internet service provider with a destination on another U.S. long distance provider, the data is first routed to the commercial Internet exchange where it makes the transfer between providers.

Personal computers typically connect to a local point-of-presence router through a local Internet carrier. A local Internet carrier obtains a direct line to the point-of-presence router and provides a modem or other connection by which a personal computer user achieves Internet access. When the personal computer connects to the modem of the local Internet carrier, the local Internet carrier switches the home computer to the point-of-presence router, which in turn connects the personal computer to the Internet.

Another method of connecting computers to the Internet is by direct connection through a local area network (LAN) to the point of presence. Multiple personal computers can be connected to a single LAN, which connects to the point of presence through a leased data line. The computers connected to the LAN receive and transmit data to the point of presence through the LAN.

Attached to most LANs are a variety of different servers including the File Server and the Hypertext Transport Protocol ("HTTP") server. The File Server connects to the LAN and contains the common data files used by the personal computers, the LAN and other servers. An HTTP server is a particular type of server that processes incoming and outgoing data written according to a certain Internet communication protocol, called hypertext transport protocol.

As described above, the Internet is able to interconnect every computer on the Internet with every other computer on the Internet. An Internet site typically includes certain data files (called "web pages" that are a part of the World Wide Web) in its File Server. The Internet site HTTP server makes those pages available to other computers on the Internet. An HTTP Server that makes World Wide Web pages available on the Internet usually includes a so-called "home page," the starting point for outside users to navigate through the underlying World Wide Web pages serviced by the HTTP Server. These World Wide Web pages are written in a special World Wide Web language called Hypertext Markup Language ("HTML"). When a personal computer user wants to view a home page, it can do so by requesting that data over the Internet. In response, the requisite LAN retrieves the web page data from its File Server and instructs its HTTP Server to transmit the data, addressed via the Internet, to the personal computer that requested the information. The data generally travels from the local leased link to the point-of-presence router near the location of the LAN, through the Internet, through the point-of-presence router near the requesting personal computer, through the local Internet carrier, and into the modem of the requesting personal computer.

Transmission Control Protocol/Internet Protocol ("TCP/IP") controls transmission of data on the Internet to provide World Wide Web communication to users. To insure that data is sent to and received by the appropriate receiver on the Internet, every device communicating on the Internet is assigned a unique address called an Internet Protocol ("IP") address. Elements of the IP address identify the location in the network that a device is connected. Other parts of the IP address identify the specific device. The IP address number has a three-digit element that identifies the state of the resident and an additional seven digits, three of which identify the local exchange of the resident and four digits that specifically identify the home of the resident. The IP address is presently a thirty-two bit binary address, readily processed by computers, but cumbersome for use by human users. Consequently, the majority of IP addresses are assigned mnemonics to make them more "user friendly." The mnemonic consists of two parts: a host name and a domain name. It is this representation of the IP address that is commonly used by Internet users to access Web sites. Conventionally within the World Wide Web, the mnemonic "www" is used to represent the host name. The remaining portion of the mnemonic represents the domain or network where the host resides. For example, a host named "www" in the domain (network) "uspto.gov".

The standard protocol used by Internet components to address each other and usually is used as a Uniform Resource Locator ("URL"). This terminology appears as the opening element in the web site address. For example, a Uniform Resource Locator indicates that the request is for "http" formatted data (i.e., a web page as opposed to, for example, an electronic mail message). The home page for the data resides on the "www" HTTP server on the "uspto.gov" LAN (or domain). The name of the file (to be found most likely in the file server supported by the uspto.gov LAN) is "homepage.html."

Once a user has received an "HTML" formatted file corresponding to a web page, the text of the displayed file may prompt the user to request additional information contained in different web page files. The prompts are referred to as "hypertext" and usually show up on a home page (or other web page) in a different color than normal text, thus distinguishing them as hypertext links. Hypertext links (also called "hyperlinks") in a document allow a reader to jump from one object to another object within the document and to objects outside of the document. Hyperlinks between documents create an informational space with no formal pathways. Hyperlinks may include any kind of hypertext or other hypermedia link connecting one HTML page to another HTML page in the currently displayed web site or in some external web site. HTML is the computer language used to "compose" and represent information on a web page. By clicking a mouse on the hypertext, the user is automatically "transported" from a current web page to a new web page linked to that hypertext.

For example, the master list server sends the request to a Domain Name Server ("DNS") responsible for handling calls to this address. If the DNS recognizes the call, then an affirmation is sent to the master list server that directs the call to the server storing the particular home page. When the hypertext is selected, the browser requests a connection to the HTTP server hosting the file and it also requests from the HTTP server the file identified by the URL address. If the HTTP server accepts the connection requested by the browser, the HTTP server proceeds to transmit the requested file back to the browser. Once the browser receives the requested file, it delivers or presents the content of the file to the requesting user.

One of the most popular mediums for browsing the Internet is the World Wide Web. The World Wide Web is a client/server application that helps the user access various HTML pages available at various Internet sites. Its function is to display documents and to make links between items of information available. The user then chooses which links to follow as the user pursues a course through various World Wide Web pages. An Internet World Wide Web site refers to an entity connected to the Internet that supports World Wide Web communications and/or World Wide Web files. A typical web site will include an HTTP server and one or more HTML pages (sometimes referred to as World Wide Web pages).

A web site is usually configured to include a home page and a plurality of HTML pages that may each contain one or more hyperlinks. As a user clicks on one hyperlink in the home page, the user is transported to another HTML page. Further pages may have, for example, a hyperlink that returns the user to the home page or a hyperlink that forwards the user to a subsequent page.

Turning now to the drawings, FIG. 1 depicts a web-based system for integrating casino gaming with non-casino interactive gaming in accordance with the present invention. The system includes a central server system 10, a plurality of player-operated gaming machines 12, and a plurality of player-operated computing devices 14. The central server system 10 may include the local casino servers 10*a*, the casino web server 10*b*, and/or the casino corporate server 10*c*. The central server system 10 offers a plurality of wagering games in such categories as slots, poker, bingo, keno, and blackjack. The gaming machines 12 are located in one or more land-based casinos and linked to the central server system 10 by a reconfigurable, multi-site computer network such as an intranet. The computing devices 14 are remote from any land-based casino and, with proper authorization, linked to the central server system 10 by the Internet. The wagering games may be conducted via either the gaming machines 12 or the computing devices 14.

Thus, the system in FIG. 1 is preferably a web-based system utilizing an intranet and the Internet. An intranet is a network based on TCP/IP (Transmission Control Protocol/Internet Protocol) protocols belonging to an organization, usually a corporation, accessible only by the organization's members, employees, or others with authorization. In the illustrated system, the intranet is used to securely network the gaming machines 12 to each other and the central server system 10. The casino web server 10*b* operates the intranet's web site and posts the plurality of wagering games on the web site. The web site looks and acts just like any other web sites, but a firewall surrounding the intranet fends off unauthorized access. With proper authorization, non-casino-based computing devices 14 may access the intranet via the Internet and therefore be linked to the central server system 10 and even the gaming machines 12 if necessary. By opening the intranet operating in the land-based casinos to the non-casino-based computing devices 14, players can play the same wagering games at the casino and away from the casino. Therefore, casinos can have one central slot tracking system and one central data repository, e.g., at a corporate headquarters 30, for all land-based and cyberspace operations.

A wagering game is generally conducted by receiving a wager from a player, generating a random event, and providing an award to the player for a winning outcome of the random event. The term "random" as used herein in intended to encompass both a truly random event and a pseudo-random event. A wagering game includes audiovisual content and game software (i.e., decision logic) for generating the random event. The audiovisual content includes sounds, images, and animations. The game software includes a random number generator (RNG) and game play routines directing the sequence of play of the wagering game.

When a wagering game is conducted via a gaming machine 12, the wagering game may be conducted at a central server level, a machine level, or a hybrid server/machine level depending upon how the machine and the system are set up. When the wagering game is conducted at the server level, the game's audiovisual content and game software are executed at the central server system 10 by, for example, the local casino server 10*a* in the same casino as the gaming machine 12. In this case, the gaming machine 12 may be free of a game engine for executing the game software and primarily serve as a display terminal. When the wagering game is conducted at the machine level, the audiovisual content and game software are executed at the gaming machine 12. To allow the gaming machine 12 to execute the audiovisual content and game software, this information is downloaded from the central server system 10 to the gaming machine 12 and stored locally on the gaming machine prior to conducting the wagering game. When the wagering game is conducted at the hybrid server/machine level, the audiovisual content is executed at the gaming machine 12 while the game software is executed at the central server system 10. To allow the gaming machine 12 to execute the audiovisual content, the audiovisual content is downloaded from the central server system 10 to the gaming machine 12 and stored locally on the gaming machine prior to conducting the wagering game.

When a wagering game is conducted via a computing device 14, the wagering game may be conducted at a central server level or a hybrid server/device level depending upon how the device and the system are set up. When the wagering game is conducted at the server level, the game's audiovisual content and game software are executed at the central server system 10 preferably by the casino web server 10*b*. When the wagering game is conducted at the hybrid server/device level, the audiovisual content is executed at the computing device 14 while the game software is executed at the central server system 10. To allow the computing device 14 to execute the audiovisual content, the audiovisual content is downloaded from the central server system 10 to the computing device 14 and stored locally on the computing device prior to conducting the wagering game. In order to make wagering games conducted via a computing device 14 verifiable, the random event must be generated at the central server system 10. Therefore, a wagering game may not be conducted solely at a device level.

In one embodiment, each wagering game is offered in two distinct versions: basic and enhanced. On the one hand, the basic version is conducted at the server level such that it is played over the network using JavaScript or other open or proprietary language. The basic version allows a player to quickly sample a wagering game. On the other hand, the enhanced version includes upgraded audiovisual content that is downloaded from the central server system 10 to the machine or computing device used to conduct the wagering game. Instead of downloading the upgraded audiovisual content from the central server system 10, such content may be distributed to the appropriate machine or computing device from other storage media (EPROM, CD-ROM, hard disk, etc.) that are either installed directly in the machine or device or are linked to the machine or device for downloading the content thereto. The upgraded audiovisual content is stored locally on that machine or computing device. The enhanced version treats the player with a more exciting and entertaining multimedia experience than the basic version. When the enhanced version is conducted via a gaming machine 12, the enhanced version may be conducted at either the machine level or the hybrid server/machine level. When the enhanced version is conducted via a computing device 14, the enhanced version may be conducted at the hybrid server/device level.

The central server system 10 may include the local casino servers 10*a*, the casino web server 10*b*, and/or the casino corporate server 10*c*. Each server includes a microprocessor, a clock, and an operating system associated therewith. The microprocessor executes instructions from its read only memory (ROM) and, during such execution, the microprocessor temporarily stores and accesses information from a random access memory (RAM).

In one embodiment, the local casino server 10*a* is responsible for accumulating and consolidating data generated from casino-based gaming and transmitting such data between the casino corporate server 10*c* and the gaming machines 12 in the same casino as the server 10*a*. When a wagering game is conducted via a gaming machine 12 at a server level or a hybrid server/machine level, the local casino server 10*a* is also responsible for executing all or a portion of the wagering game. The casino web server 10*b* is responsible for accumulating and consolidating data generated from non-casino-based gaming and transmitting such data between the casino corporate server 10*c* and the computing devices 14. The casino web server 10*b* is also responsible for executing all or a portion of a wagering game conducted via a computing device 14.

In another embodiment, the local casino servers 10*a* merely serve as passthrough components. The casino web server 10*b* is responsible for accumulating and consolidating data generated from both casino-based gaming and non-casino-based gaming and transmitting such data between the casino corporate server 10*c* and both the gaming machines 12 and the computing devices 14.

The gaming machines 12 are networked to each other and the central server system 10 by the intranet. The gaming machines 12 in each land-based casino are linked by a high-speed local area network, such as a wireless or wired Ethernet. Each local area network supports standard Internet protocols, such as TCP/IP, for transmitting data over the local area network and transmitting data between the local area network and the central server system 10. Each local area network may include the local casino server 10*a*, a casino floor communications hub 16, and a workstation 18. The local casino server 10*a* may include a gateway that serves as an entrance to the local area network. The gateway is associated with a router, which knows where to direct a given packet of data that arrives at the gateway, and a switch, which furnishes the actual path in and out of the gateway for a given packet. The casino floor communications hub 16 consolidates data transferred to and from the gaming machines 12. The workstation 18 may be used to program, control, and monitor the gaming machines 12 at the local casino level.

Each gaming machine 12 has the appearance of a typical upright or slant-top video gaming machine. The gaming machine 12 includes a cabinet and at least one video display mounted within the cabinet. The cabinet is situated on either a floor of the casino or a stand resting on the floor. A player may operate the gaming machine 12 via either physical button panel below the video display or a touch screen overlying the video display. To help differentiate the casino-based gaming machines 12 from the non-casino-based computing devices 14, the gaming machines 12 couple the genuine feel of a typical gaming machine with large display screens, excellent graphics, hi-fidelity sound, and other physical attributes.

The computing devices 14 may, for example, include a personal computer (portable or desktop), Internet appliance, personal digital assistant, wireless telephone, and pager. Depending upon the device, the computing devices 14 may be used at home, in a hotel room, or while traveling. The computing devices 14 are remote from any land-based casino, although they may be used in a hotel room, by the pool, in the fitness room, or in some other facility of a hotel containing a casino. Each computing device 14 preferably includes a central processing unit (CPU) and various peripherals linked to the CPU. If the computing device 14 is a personal computer, for example, the peripherals may include a video display, a keyboard, a mouse, and a touch screen overlying the video display. The CPU executes instructions from its read only memory (ROM) and, during such execution, the CPU temporarily stores and accesses information from a random access memory (RAM). If a computing device 14 is to access the above-noted intranet via the Internet, the computing device 14 must initially access the Internet through an Internet Service Provider (ISP) 20 (also known as Internet Access Provider (IAP)) and communicate with the Internet using standard Internet protocols such as TCP/IP.

One or more security measures protect the intranet from unauthorized access. Therefore, after accessing the Internet, the computing device 14 must circumvent these security measures to access the intranet and, more specifically, the gaming web site operated by the casino web server 10*b*. One security measure may require the computing device 14 to be equipped with a proper hardware or software security key enabling the computing device 14 to access the intranet and the gaming web site. The security key may be linked to a global positioning system to enable the location of the computing device 14 to be tracked for tax and legality purposes. To access the gaming web site, a player enters the host name and the domain name for the web site in the address field of the web browser used by the player to navigate the Internet. Another security measure may require a player to log into the "secure" gaming web site using such login information as a user name and password that are previously registered (see below) with the casino that operates the web site. Without the correct login information, the player is denied access to all but the login page(s) of the gaming web site or, alternatively, is denied access to only those portions of the web site involving wagering.

The registration procedure may require the player to open a record or "house" account at a registration facility of the casino. The player's account is stored in a database at the corporate headquarters 30 and/or the casino web server 10*b*. During the registration procedure, the casino may require the player to submit various types of information to be stored in the player's account, including name, date of birth, social security number, address, telephone number(s), credit card type, number and expiration date, and other requisite information. Additional optional fields may include player tracking information, player preferences, and server preferences (described below). The casino preferably requires the player to verify his or her identity with one or more commonly accepted forms of identification, such as a driver's license, passport, social security card, etc. The login information for logging into the gaming web site may be selected by the casino or the player and then stored in the player's account. The casino provides the registered player with the hardware or software security key to install on the player's computing device 14 to enable the computing device to access the intranet. The casino may limit the registered player to a single security key for installation on a single computing device 14 or, if requested by the player, may provide the player with multiple security keys for installation on multiple computing devices 14.

Once a computing device 14 is granted full access to the gaming web site operated by the casino web server 10*b*, the player may proceed to play the wagering games available on the web site. The web site may identify numerous gaming categories and present such categories with hyperlinks. The categories may, for example, include slots, poker, bingo, keno, and blackjack. Under each category, the web site may identify specific wagering games available for play and may allow a player to commence play of such games with respective hyperlinks. The slots category may, for example, include a library of slot games.

The gaming web site may be set up to accept wagers by electronic funds transfer (EFT) from one or more monetary sources. One monetary source may be a credit card, in which case the player must provide the casino web server 10*b* with credit card information (e.g., credit card type, number, and expiration date) either during the registration procedure (see above) or upon login to the gaming web site. Another monetary source may be money stored in the player's house account, in which case the player must deposit money into the house account or arrange for a line of credit in the house account during the registration procedure. The casino web server 10*b* deducts wagers from the monetary source and adds payoffs for winning game outcomes to the monetary source.

The corporate headquarters 30 includes a corporate casino computer 34, the casino corporate server 10*c*, a trend analysis computer 36, a database manager 38, and various databases 40*a-f*. The corporate casino computer 34 may be used to program, control, and monitor the gaming machines 12 and the computing devices 14 at the corporate level and view the data accumulated in the various databases 40*a-f*. The casino corporate server 10*c* is linked to the intranet for transferring data to and from the intranet.

The database manager 38 manages data acquired from the intranet by the casino corporate server 10*c* and routes the acquired data for storage in the appropriate databases 40*a-f*. The game library database 40*a* stores a plurality of wagering games. The corporate casino computer 34 may cause the database manager 38 to selectively access the wagering games in the game library database 40*a* and download the selected games to the local casino servers 10*a* and/or the casino web server lob. The local casino servers 10*a* may, in turn, download a portion or all of each selected game to some or all of the gaming machines 12 in their respective casinos. The wagering games selected for download and the locations to where the games are downloaded may be based on trends established by running alternate regressions in the trend analysis computer 36. The financial accounting database 40*b* stores general financial accounting information.

The player account database 40*c* includes multiple records or "house accounts" each having multiple fields of information related to the identification of each player. The fields within each account may, for example, include name, date of birth, social security number, address, telephone number(s), credit card type, number and expiration date, and other requisite information. Additional optional fields may include player tracking information, player preferences, and server preferences. Based on the player tracking information, player preferences, and server preferences in a player's account, the central server system 10 may adapt or configure the displayed menu(s) of selectable games and the wagering games themselves based on the player.

The player tracking information may include such game play data as an identification of last ten machines played, titles of the games played, and jackpots and other prizes won by the player. For each denomination (e.g., nickel, dime, quarter, half-dollar, dollar, etc.), the game play data may include data fields for the number of credits played, the number of credits paid out, the number of games played, and the time of play in minutes. Of course, the amount and types of data stored in the player's account may be varied to suit a particular casino. Based on the player tracking information in the player's account, the central server system 10 may compute bonuses and other rewards to be awarded to the player when playing a wagering game via a gaming machine 12 or a computing device 14.

The player preferences generally relate to the values of those parameters that players have selected in establishing their preferred game configuration. The player preferences may include the preferred games (game type), the preferred default game configuration (language, sound options, denomination, speed of reel spins, number of pay lines played, number of credits played per pay line per reel spin), and the preferred distribution of awards (payout structure, payout options, form of complimentaries, denomination).

The server preferences reflect certain parameters that the central server system 10 can adjust according to certain criteria, such as skill level or playing frequency, to maintain the interest of its players. The server preferences may include hold percentage, complimentary award rate, complimentary award limits, game eligibility (lockout), and other information. Hold percentage indicates a range of hold percentages, such as high, medium, and low.

The progressive jackpot database 40*d* may, for example, indicate how many progressive jackpots are operating, where the jackpots are operating, how much money is in each operating jackpot, what jackpots were paid out, and when the jackpots were paid out. The slot accounting database 40*e* includes accounting meters for credits in, credits out, credits played, credits won, games played, etc. for each of the wagering games. The database 40*e* may also identify the gaming machine 12 or computing device 14 used to generate the meter data. The accounting meters allow the trend analysis computer 36 to analyze the performance of each wagering game, each gaming location, individual gaming machines 12, groups of gaming machines 12, etc. The player marketing information database 40*f* indicates, for example, the identities of players, which wagering games are being played, where the wagering games are being played, when the wagering games are being played, and how much or how long the wagering games are being played. This marketing information can, in turn, be used to assess playing habits, offer complimentaries, and engage in other types of target marketing. In addition to the various databases 40*a-f* identified above, the database manager 38 may manage other databases such as a tourism database and a hotel reservations database.

In one embodiment, the gaming machines 12 only offer the enhanced versions of wagering games, and the enhanced versions are conducted via the gaming machines 12 at the hybrid server/machine level described above. When a gaming machine 12 is initially installed and put into service, the upgraded audiovisual content of one or more wagering games is downloaded to the gaming machine 12 from the central server system 10. The initial selection of downloaded games may be determined, in part, on trends established by the trend analysis computer 36. If it is desirable to subsequently download any new wagering games after the gaming machine 12 has already been put into service, the upgraded audiovisual content of such new games may be downloaded to the gaming machine 12 in the background without disrupting (i.e., taking offline) the operation of the gaming machine 12. The gaming machines 12 may be configured to offer any or all of the wagering games available for play via the computing devices 14. New or special wagering games may be offered only for play via the gaming machines 12 or the computing devices 14. Some of the gaming machines 12 may be dedicated to a single wagering game.

The system in FIG. 1 should virtually eliminate cash float on casino floors. In the early days of the gaming industry, gaming machines were coin-in/coin-out (CICO). Over time, however, the CICO gaming machines evolved to include imbedded bill validation systems so they became coin and bill-in/coin-out (CBICO). The operational and player conveniences of CBICO gaming machines were so significant that is caused casinos to replace almost all of the equipment on their floors with slot machines so equipped. Both equipment utilization and player satisfaction increased. Due to the additional validation hardware and software, however, these CBICO gaming machines raised a casino's capital investment and dramatically increased the cash float on the casino floor. The system in FIG. 1 allows for real-time cashless (credit/debit card, smart card, house account, etc.) verification or retrieval of stored financial account information for frequent players. The financial account information for each player may be stored in the player account database 40*c*. This virtually eliminates cash float. These financial accounts may be common for a player whether the player wagers from a casino-based gaming machine 12 or a non-casino-based computing device 14. This, in turn, builds player loyalty and direct marketing opportunities. The non-currency-enabled gaming machines 12 are constructed to minimize the expensive hardware and software required to validate, store, and dispense currency on the casino floor.

Cashless transactions are not necessarily a perfect solution. Casinos must tailor their offerings to satisfy the needs of a wide variety of players. While regular players or those with an affinity for a particular casino may establish financial accounts, casual and transient players may not. To capture revenue from all types of players, at least some of the gaming machines 12 preferably are currency-enabled, i.e., constructed to accept coins and bills. These currency-enabled gaming machines 12 are preferably constructed to also handle cashless transactions and dispense coins, bills, tickets, smart cards, and house account cards. Although the currency-enabled gaming machines 12 may contain more hardware and software than a typical CBICO gaming machine, there are preferably only a limited number on the casino floor. In addition to card readers, the currency-enabled gaming machines may contain both coin and bill hoppers, ticket printers, and card dispensers. Coin and bill hoppers accept currency from players and maintain a reserve as available for dispensing. The casino may control the reserve according to the expected payouts, which would vary by time of day and the day of week. Central control from either the workstation 18 or the corporate headquarters 30 allows the casino to control the cash float on the casino floor.

The currency-enabled gaming machines 12 serve multiple functions including games, automated teller machines (ATMs), cashiers, and automated transaction machines. A transient game player may, for example, move from a currency-enabled gaming machine to a non-currency-enabled gaming machine by cashing out of the currency-enabled machine with a ticket or a house account card. A regular player may, for example, use a currency-enabled gaming machine to cash out into currency or to deposit funds into a house account. The currency-enabled gaming machines minimize transaction labor costs and maximize customer convenience.

Figure 2:
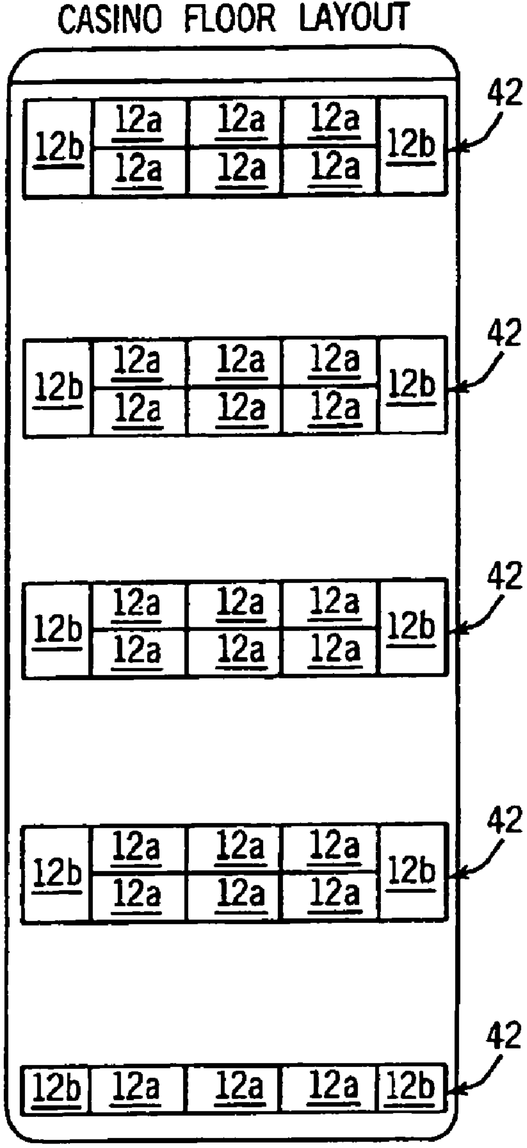
FIG. 2 is a block diagram of a casino floor layout including both non-currency-enabled gaming machines and currency-enabled gaming machines arranged in a plurality of banks.
Figure 3:
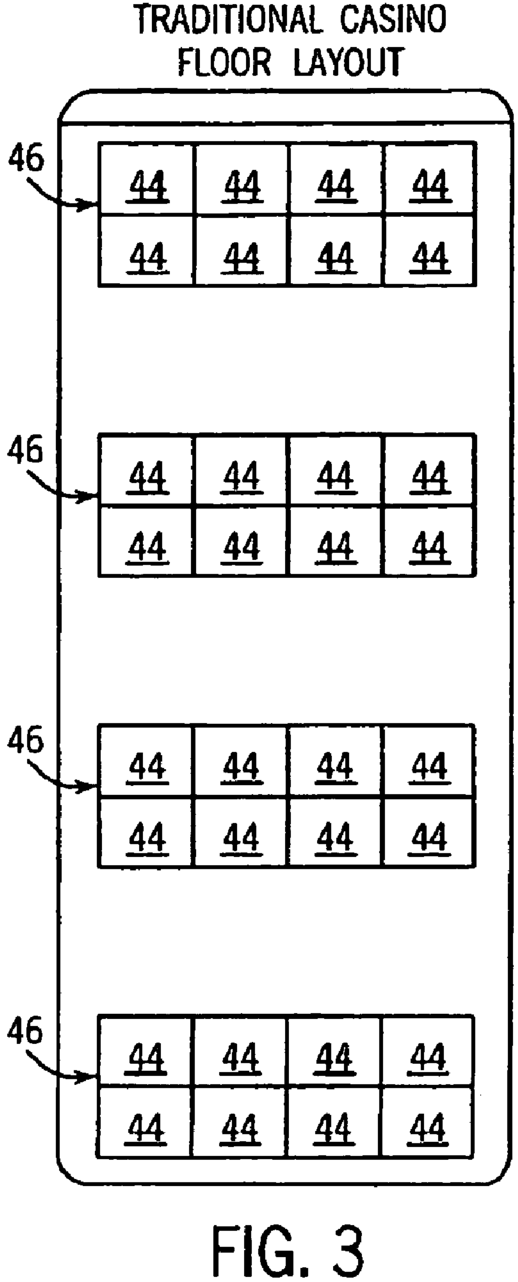
FIG. 3 (PRIOR ART)
FIG. 3 is a block diagram of a prior art casino floor layout including typical coin-in/bill-in/coin-out (CBICO) gaming machines arranged in a plurality of banks.

Although the non-currency-enabled gaming machines 12 are smaller than a typical CBICO gaming machine, the currency-enabled gaming machines 12 are slightly larger than a typical CBICO gaming machine. FIG. 2 is a block diagram of a possible casino floor layout. The casino floor layout includes both non-currency-enabled gaming machines 12*a* and currency-enabled gaming machines 12*b* arranged in a plurality of banks 42. More specifically, each bank 42 includes at least a pair of currency-enabled gaming machines 12*b* spaced from each other and a pair of rows of non-currency-enabled gaming machines 12*a* extending between the pair of currency-enabled gaming machines 12*b*. The non-currency-enabled gaming machines 12*a* in one row of a pair of rows are back-to-back with the respective non-currency-enabled gaming machines 12*a* in the other row. By locating the currency-enabled gaming machines 12*b* on the opposite ends of each bank 42 and concentrating the non-currency-enabled gaming machines 12*a* in the middle of each bank 42, a given number of gaming machines 12 requires less space on the casino floor than the same number of typical CBICO gaming machines. This can be seen by comparing FIG. 2 to FIG. 3, which shows a prior art casino floor layout including typical CBICO gaming machines 44 arranged in a plurality of banks 46. The higher density of the gaming machines 12 in FIG. 2 relative to the density of the typical CBICO gaming machines 44 in FIG. 3 maximizes revenue potential from a smaller space on the casino floor. Although the casino floor layout in FIG. 2 is efficient, other layouts for efficiently arranging the non-currency-enabled gaming machines 12*a* and the currency-enabled gaming machines 12*b* together in banks are possible.

Similar wagering games may be conducted via either a casino-based gaming machine 12 or a non-casino-based computing device 14. By integrating the player's casino gaming experience with the player's non-casino interactive gaming experience, it is believed that casinos can strengthen their relationship with players and effectively cross train casino-based players and non-casino-based players. Casino-based players can become familiar with the ability to gamble outside of the casino (e.g., at home, in a hotel, or while traveling) and non-casino-based players can increase the experiential nature of the casino's brand image.

Utilizing a web-based, intranet/Internet system provides a means to fully integrate a casino's operations. As such a system evolves, information from a casino's reservation system may be used to optimize a casino floor to guests of the casino's hotel. For example, if a florist convention is at the casino, demographically appropriate game themes may be displayed on idle gaming machines 12 in the casino. Similarly, as a boxing match or magic show let out, idle gaming machines 12 in close proximity to the events may be instantly reconfigured to display appropriate game themes. Real-time data on the effectiveness of these marketing efforts can be analyzed, and the system can adjust itself to maximize the casino's earnings.

By utilizing a web-based intranet to operate within the confines of a given casino, a casino can track all financial and marketing information from its casino floors from the corporate headquarters 30 in real time. The casino can gather valuable marketing information and use such information to build stronger relationships with its customers. By opening the bridge from this intranet to the Internet, the casino can operate one system for their casino operations on land and in cyberspace. Linking the Internet with the casino floor provides new revenue streams and maximizes brand leverage.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims:

What is claimed is:

1. A method of integrating casino gaming with non-casino interactive gaming at a central server system, comprising:

offering a plurality of wagering games on the central server system, the plurality of wagering games each including audiovisual content and game software for generating a random event, the audiovisual content including computer-generated image and animation data representing the random event, wherein at least one of the wagering games includes a basic version and an enhanced version having upgraded audiovisual content relative to the basic version;

establishing a communications link between the central server system and a player-operated gaming machine in a land-based casino;

conducting a first of the wagering games via the player-operated gaming machine, wherein the audiovisual content for the first of the wagering games is presented at the gaming machine;

establishing, via a reconfigurable computer network, a communications link between the central server system and a player-operated computing device remote from any land-based casino;

authorizing the computing device to access the first or a second of the wagering games offered on the central server system;

conducting the second of the wagering games via the player-operated computing device by generating a random event for the second of the wagering games at the central server system;

wherein the audiovisual content for the second of the wagering games is presented at the computing device;

configuring the gaming machine, the computing device, or the central server system to conduct the basic version or the enhanced version based on whether the game software is executed locally at the gaming machine or at the computing device, or executed remotely at the central server system, or executed locally and remotely; and providing, at the gaming machine, an award for a winning outcome of the random event for the first of the wagering games.

2. The method of claim 1, wherein the wagering game is selected from a group consisting of slots, poker, bingo, keno, and blackjack.

3. The method of claim 1, wherein the computer network includes an intranet.

4. The method of claim 1, further including downloading the audiovisual content for the second of the wagering games from the central server system to the gaming machine, and wherein the conducting the second of the wagering games includes executing the game software at the central server system, and wherein the configuring includes configuring the gaming machine to conduct the basic version of the at least one of the wagering games, wherein the at least one of the wagering games is the second of the wagering games.

5. The method of claim 1, further including downloading the audiovisual content and the game software for the first of the wagering games from the central server system to the gaming machine, wherein the conducting the first of the wagering games includes displaying the audiovisual content and executing at least a substantial portion of the game software at the gaming machine, and wherein the configuring includes configuring the gaming machine to conduct the enhanced version of the at least one of the wagering games, wherein the at least one of the wagering games is the first of the wagering games.

6. The method of claim 1, wherein the offering includes offering a web site operated by the central server system.

7. The method of claim 1, wherein the gaming machine is free of a game engine for executing the game software.

8. The method of claim 1, wherein the computer network supports TCP/IP protocols for transmission of data thereon.

9. The method of claim 1, wherein the configuring includes configuring the central server system to conduct the basic version responsive to the game software being executed remotely at the central server system.

10. The method of claim 1, wherein the configuring includes configuring the gaming machine or the computing device to conduct the enhanced version responsive to the game software being executed locally.

11. The method of claim 1, further comprising storing financial account information in a player account database that is remote from the gaming machine and from the computing device, wherein the player account database is communicatively accessible by the gaming machine and by the computing device, wherein the player account database includes a plurality of records having multiple fields of information related to an identification of each player.

12. The method of claim 11, wherein the fields include at least one of a player's name, date of birth, social security number, address, a telephone number, or credit card information.

13. The method of claim 12, wherein the fields further include at least one of player tracking information, player preferences, or server preferences, the method further comprising configuring the central server system to configure menus of the first wagering game based on the at least one of the player tracking information, the player preferences, or the server preferences.

14. The method of claim 13, further comprising computing a bonus to be awarded to a player of the first wagering game or the second wagering game based upon the player preferences associated with the player.

15. The method of claim 1, further comprising:

storing financial account information in a player account database that is remote from the gaming machine and from the computing device, wherein the player account database is communicatively accessible by the gaming machine and by the computing device.

16. A method of integrating casino gaming with non-casino interactive gaming, comprising:

offering a plurality of wagering games on a central server system, the plurality of wagering games each including audiovisual content and game software for generating a random event, the audiovisual content including computer-generated image and animation data representing the random event, wherein at least one of the wagering games includes a basic version and at least another one of the wagering games includes an enhanced version having upgraded audiovisual content relative to the basic version;

providing a player-operated gaming machine in a land-based casino and linked to the central server system;

conducting a first of the wagering games via the player-operated gaming machine, wherein the audiovisual content for the first of the wagering games is presented at the gaming machine;

providing, at the gaming machine, an award for a winning outcome of the random event for the first of the wagering games;

providing a player-operated computing device remote from any land-based casino and linked to the central server system by a reconfigurable computer network;

authorizing the computing device to access a second of the wagering games offered on the central server system;

conducting the second of the wagering games via the player-operated computing device, wherein the random event for the second of the wagering games is generated at the central server system and wherein the audiovisual content for the second of the wagering games is presented at the computing device; and configuring the gaming machine, the computing device, or the central server system to conduct the basic version or the enhanced version based on whether the game software is executed locally at the gaming machine or at the computing device, or executed remotely at the central server system, or executed locally and remotely.

17. The method of claim 16, wherein the conducting the first wagering game includes receiving a wager from a player, automatically generating the random event, and wherein the conducting the second wagering game includes receiving a wager from a player and providing an award to the player for a winning outcome of the random event for the second wagering game.

18. The method of claim 16, wherein the plurality of wagering games are selected from a group consisting of slots, poker, bingo, keno, and blackjack.

19. The method of claim 16, wherein the computer network includes an intranet.

20. The method of claim 19, wherein the computing device is linked to the central server system by the Internet.

21. The method of claim 20, further including enabling the computing device to be linked to the central server system by the Internet using a security key.

22. The method of claim 16, further including downloading the audiovisual content and the game software for the first wagering game from the central server system to the gaming machine, and wherein the conducting the first one of the wagering games via a player-operated gaming machine includes displaying the audiovisual content for the first wagering game and executing the game software for the first wagering game at the gaming machine.

23. The method of claim 16, further including downloading the audiovisual content for the second wagering game from the central server system to the computing device, and wherein the conducting the second of the wagering games via the player-operated computing device includes displaying the audiovisual content for the second wagering game at the computing device and executing the game software for the second wagering game at the central server system.

24. The method of claim 16, wherein the offering the plurality of wagering games on the central server system includes posting the wagering games on a web site operated by the central server system.

25. The method of claim 16, wherein the gaming machine is free of a game engine for executing the game software such that the game software for the first wagering game is executed by the central server system.

26. The method of claim 16, wherein the at least one of the wagering games is the first of the wagering games, and wherein the conducting the first of the wagering games via a player-operated gaming machine includes playing the basic version over the computer network using JavaScript or other language.

27. The method of claim 16, wherein the at least one of the wagering games is the second of the wagering games, and wherein the conducting the second of the wagering games via the player-operated computing device includes playing the basic version using JavaScript or other language.

28. The method of claim 16, further including downloading the upgraded audiovisual content of the enhanced version from the central server system to the computing device and storing the upgraded audiovisual content locally on the computing device.

29. The method of claim 16, further including downloading the upgraded audiovisual content from the central server system to the gaming machine and storing the audiovisual content locally on the gaming machine.

30. The method of claim 16, wherein when the basic version is conducted via one of the computing device and the gaming machine, the basic version is played using JavaScript or other language, and wherein when the enhanced version is conducted via one of the computing device and the gaming machine, the upgraded audiovisual content is downloaded to and stored locally on the one of the computing device and the gaming machine.

31. The method of claim 16, wherein the computer network supports TCP/IP protocols for transmission of data thereon.

32. The method of claim 16, further comprising:

storing financial account information in a player account database that is remote from the gaming machine and from the computing device, wherein the player account database is communicatively accessible by the gaming machine and by the computing device;

receiving a wager from a player to play the first of the wagering games or the second of the wagering games;

deducting an amount corresponding to the wager from a monetary source based on the financial account information associated with the player.

33. The method of claim 16, further comprising:

storing financial account information in a player account database that is remote from the gaming machine and from the computing device, wherein the player account database is communicatively accessible by the gaming machine and by the computing device.

34. A central server system for integrating casino gaming with non-casino interactive gaming, comprising:

a plurality of wagering games offered by the central server system, each of the plurality of wagering games including audiovisual content and game software for generating a random event, the audiovisual content including computer-generated image and animation data representing the random event, wherein at least one of the wagering games includes a basic version and an enhanced version having upgraded audiovisual content relative to the basic version; and one or more controllers programmed to:

establish a communication link between the central server system and a player-operated gaming machine located in a land-based casino, conduct a first of the wagering games via the player-operated gaming machine, the audiovisual content for the first wagering game being presented at the gaming machine, establish, via a reconfigurable computer network, a communications link between the central server system and a player-operated computing device remote from any land-based casino, authorize the computing device to access a second of the wagering games offered on the central server system, cause an award for a winning outcome of the random event for the first of the wagering games to be provided at the gaming machine, conduct the second of the wagering games via the player-operated computing device by generating the random event of the second wagering game at the central server system, the audiovisual content for the second wagering game being presented at the computing device, and configure the gaming machine, the computing device, or the central server system to conduct the basic version or the enhanced version based on whether the game software is executed locally at the gaming machine or at the computing device, or executed remotely at the central server system, or executed locally and remotely.

35. The system of claim 34, wherein the plurality of wagering games are selected from a group consisting of slots, poker, bingo, keno, and blackjack.

36. The system of claim 34, wherein the computer network includes an intranet.

37. The system of claim 36, wherein the computer network includes the Internet.

38. The system of claim 37, wherein the computing device includes a security key enabling the computing device to be linked to the central server system by the Internet.

39. The system of claim 34, wherein the gaming machine receives the audiovisual content for the first wagering game and the game software for the first wagering game from the central server system, stores the audiovisual content for the first wagering game and the game software for the first wagering game locally, and executes the game software for the first wagering game.

40. The system of claim 34, wherein the central server system executes the audiovisual content for the second wagering game and the game software for the second wagering game.

41. The system of claim 34, wherein the central server system executes the game software for the second wagering game, and wherein the computing device receives the audiovisual content for the second wagering game from the central server system and stores the audiovisual content for the second wagering game locally.

42. The system of claim 34, further comprising a web site posting the plurality of wagering games and operated by the central server system.

43. The system of claim 34, wherein the gaming machine is free of a game engine for executing the game software.

44. The system of claim 34, wherein the computing device plays the basic version using JavaScript or other language.

45. The system of claim 34, wherein the gaming machine plays the basic version over the computer network using JavaScript or other language.

46. The system of claim 34, wherein the computing device receives the upgraded audiovisual content from the central server system and stores the upgraded audiovisual content locally.

47. The system of claim 34, wherein the gaming machines receive the upgraded audiovisual content from the central server system and store the upgraded audiovisual content locally.

48. The system of claim 34, wherein when the gaming machine or the computing device is used to conduct the basic version, the basic version is played using JavaScript or other language, and wherein when the gaming machine or the computing device is used to conduct the enhanced version, the upgraded audiovisual content is downloaded to and stored locally on the gaming machine or on the computing device.

49. The system of claim 34, wherein the plurality of games are affiliated with a common entity.

50. The system of claim 34, wherein the computer network supports TCP/IP protocols for transmission of data thereon.

51. The system of claim 34, wherein the one or more controllers is further programmed to retrieve financial account information stored in a player account database that is remote from the gaming machine and from the computing device, wherein the player account database is communicatively accessible by the gaming machine and by the computing device.

52. A method of integrating casino gaming with non-casino interactive gaming, comprising:

offering a plurality of wagering games on the central server system, the plurality of wagering games each including audiovisual content and game software for generating a random event, the audiovisual content including computer-generated image and animation data representing the random event, wherein at least one of the wagering games includes a basic version and an enhanced version having upgraded audiovisual content relative to the basic version;

establishing a communications link between the central server system and a plurality of player-operated gaming machines in a land-based casino;

causing a first of the wagering games to be conducted via a first of the gaming machines by generating a random event for the first wagering game at the first gaming machine, wherein the audiovisual content for the first of the wagering games is presented at the first gaming machine;

providing, at the first gaming machine, an award for a winning outcome of the random event for the first of the wagering games;

establishing, via a reconfigurable computer network, a communications link between the central server system and a player-operated computing device remote from any land-based casino;

authorizing the computing device to access a second of the wagering games offered on the central server system over the computer network;

causing the second of the wagering games to be conducted via the player-operated computing device by generating a random event for the second of the wagering games at the central server system; and configuring the gaming machine, the computing device, or the central server system to conduct the basic version or the enhanced version based on whether the game software is executed locally at the gaming machine or at the computing device, or executed remotely at the central server system, or executed locally and remotely, wherein the audiovisual content for the second of the wagering games is presented at the computing device.

53. The method of claim 52, further comprising downloading the game software for the first wagering game from the central server system to the first gaming machine.

54. The method of claim 52, further comprising downloading the audiovisual content for the first wagering game from the central server to the first gaming machine.

55. The method of claim 52, further comprising downloading the game software for the first wagering game from the central server system to the first gaming machine prior to the causing the first wagering game to be conducted; and downloading the audiovisual content for the first wagering game from the central server to the first gaming machine.

56. The method of claim 52, further including downloading the upgraded audiovisual content of the enhanced version from the central server system to the computing device and storing the upgraded audiovisual content locally on the computing device.

57. The method of claim 52, wherein the plurality of gaming machines includes a second gaming machine that is free of a game engine for executing the game software, the method further comprising:

causing a third of the wagering games to be conducted via a second gaming machine, wherein the audiovisual content for the third wagering game is presented at the second gaming machine; and executing the game software for the third wagering game at the central server system.

58. The method of claim 52, further comprising storing financial account information in a player account database that is remote from the gaming machine and from the computing device, wherein the player account database is communicatively accessible by the gaming machine and by the computing device.

* * * * *